United States Patent
Arnold et al.

[15] 3,693,721
[45] Sept. 26, 1972

[54] APPARATUS AND TECHNIQUE FOR HARVESTING PLANTS ROOTED IN THE GROUND

[72] Inventors: Eugene W. Arnold; Earl D. Hasenwinkle, both of Longview, Wash.

[73] Assignee: Weyerhaeuser Company, Tacoma, Wash.

[22] Filed: Sept. 24, 1970

[21] Appl. No.: 75,219

[52] U.S. Cl. .................................................171/61, 47/1
[51] Int. Cl. ...............................................A01d 25/04
[58] Field of Search......171/61, 62, 21, 32, 101, 103, 171/104

[56] References Cited

UNITED STATES PATENTS

| | | | |
|---|---|---|---|
| 2,368,895 | 2/1945 | Spiegl | 171/62 |
| 1,060,968 | 5/1913 | Bocker | 171/101 |
| 2,902,997 | 9/1959 | Hawkins et al. | 171/61 |
| 2,833,358 | 5/1958 | Lust | 171/61 |

Primary Examiner—Antonio F. Guida
Attorney—Christensen, Sanborn & Matthews

[57] ABSTRACT

The apparatus includes means for severing the body of earth contiguous to the roots of the plants from the surrounding ground; and means for relatively removing the plants from the body of root-contiguous earth, including means for lifting the plants in relation to the ground, and means for agitating the body of root-contiguous earth when it is severed from the ground, so as to loosen the earth and reduce its cohesion with respect to the roots, before the plants are lifted in relation to the ground. The apparatus is thus able to harvest the plants without undue damage to the roots. In addition, damage to the stems is minimized through the use of a special elastomer-faced belt lift mechanism as part of the lift means; and a rapid harvesting rate is maintained through the use of a special apparatus and technique for collecting and discharging the plants from the lift mechanism in a containerized condition.

18 Claims, 14 Drawing Figures

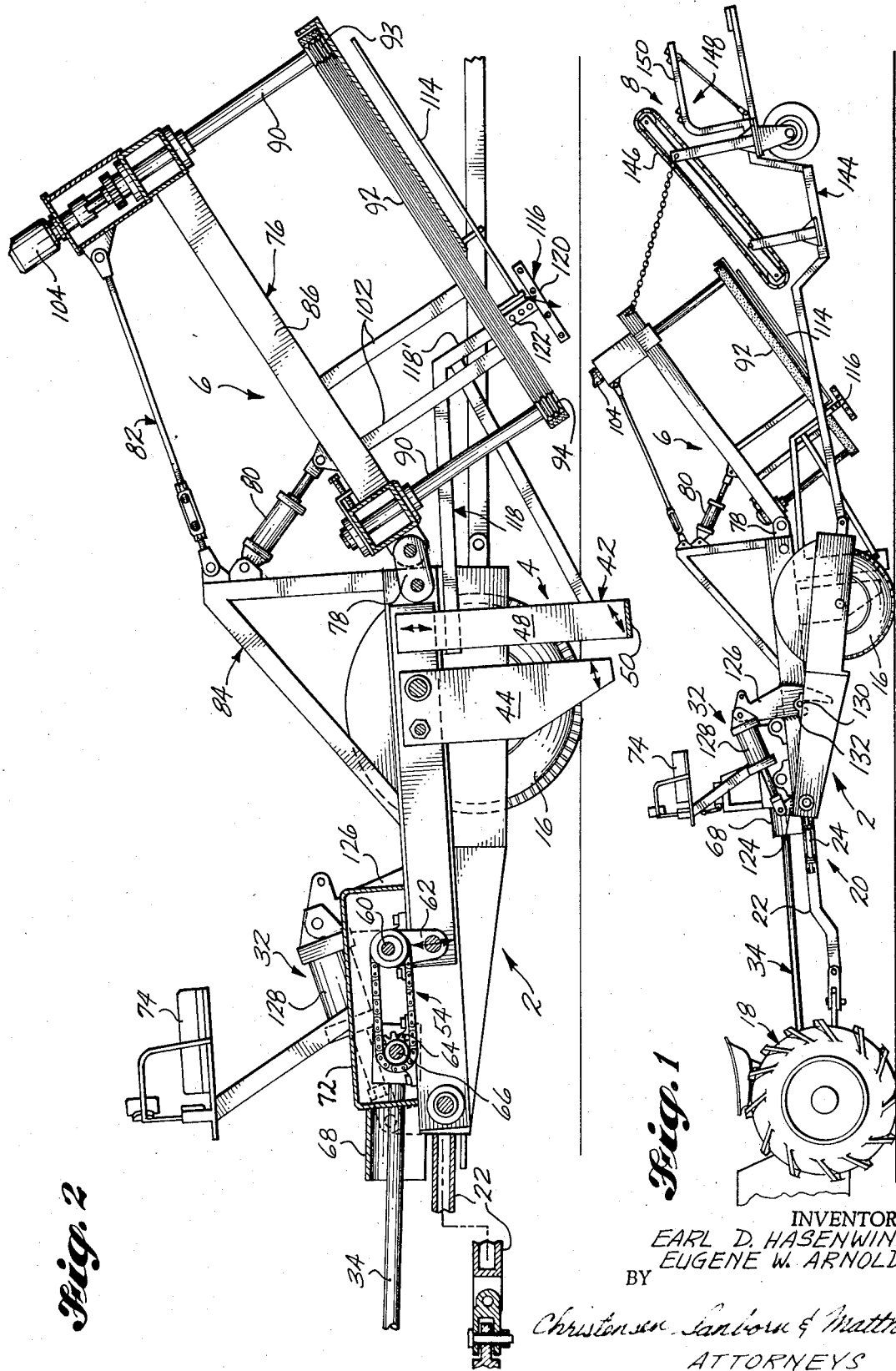

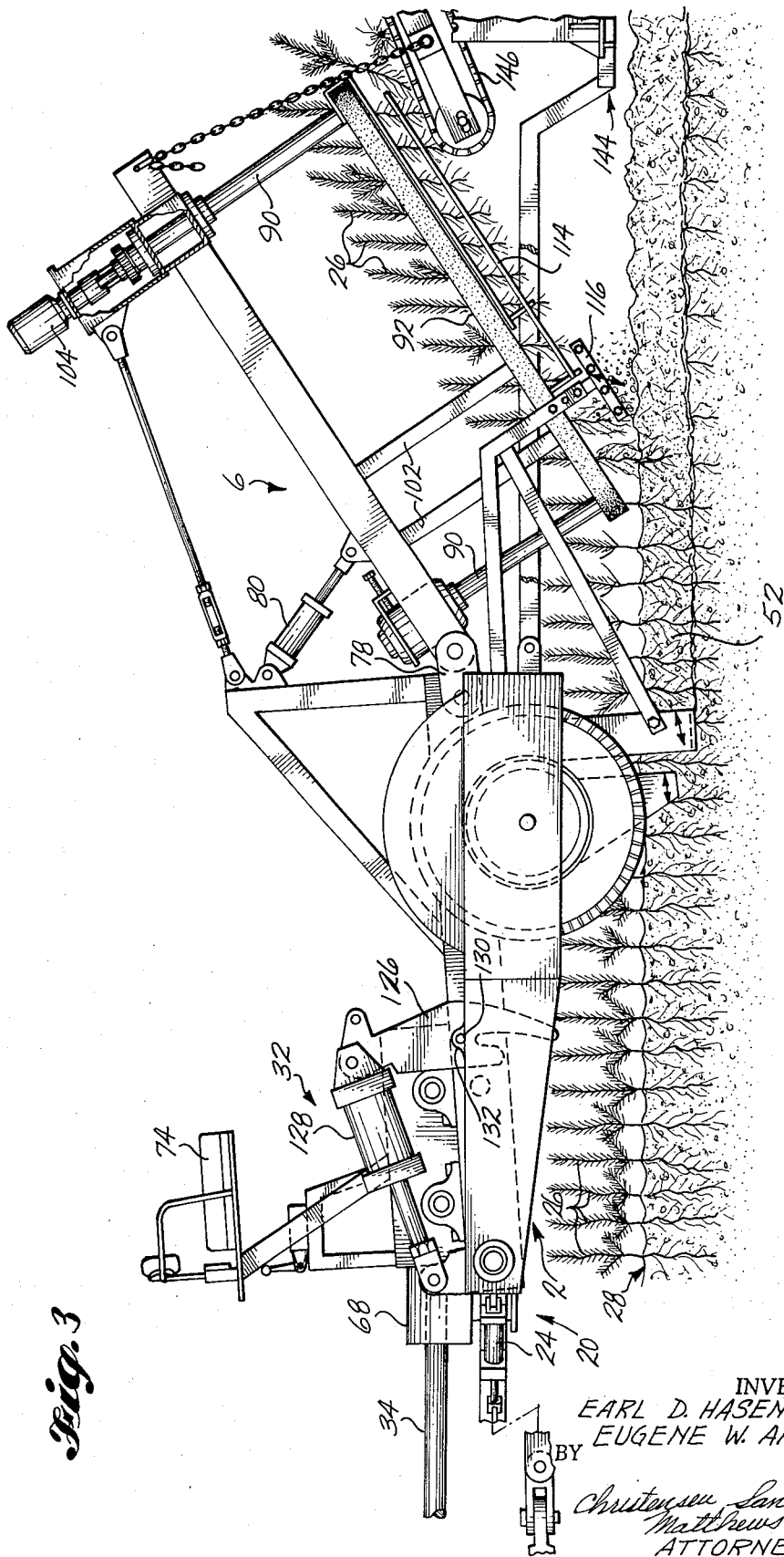

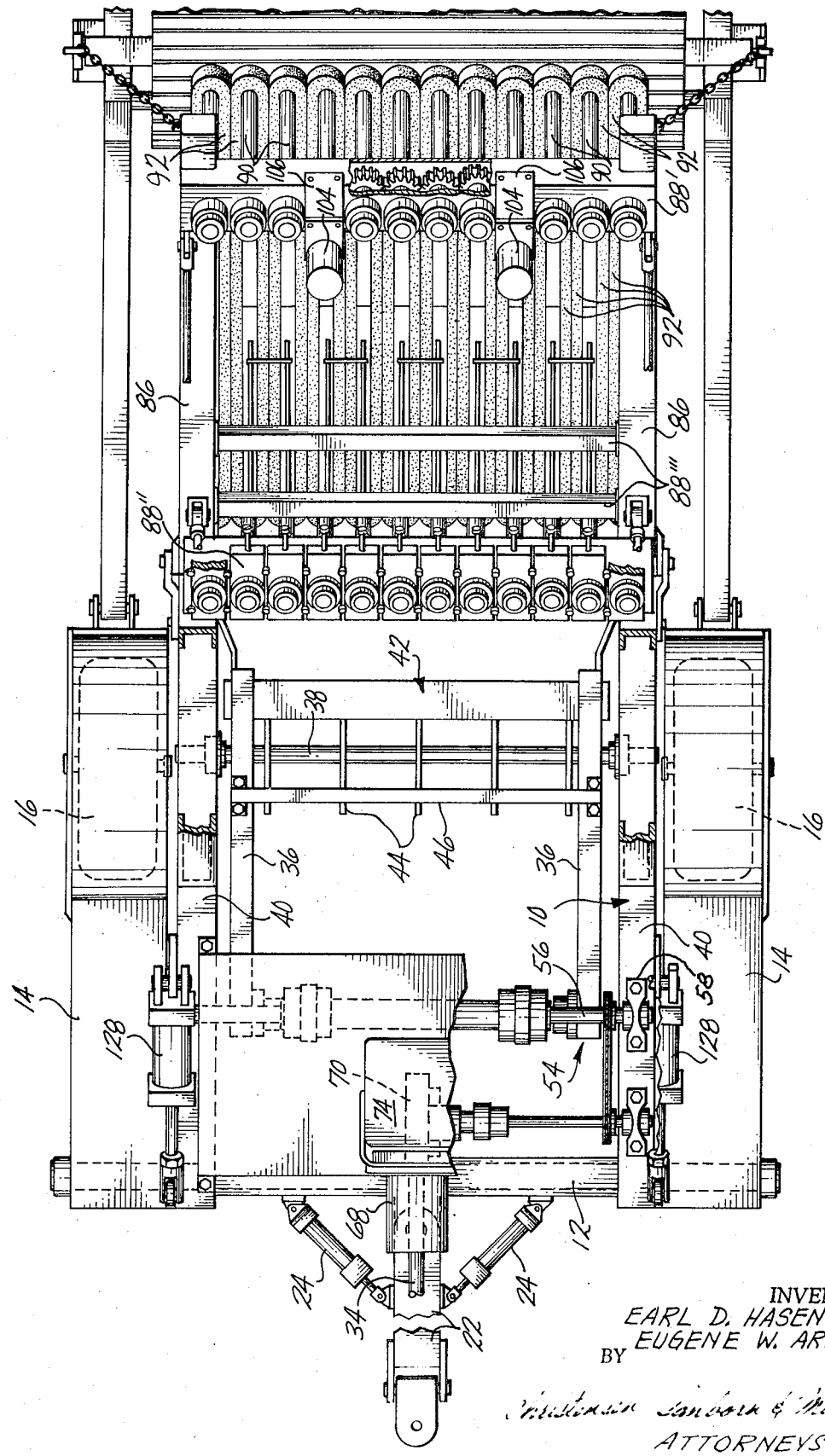

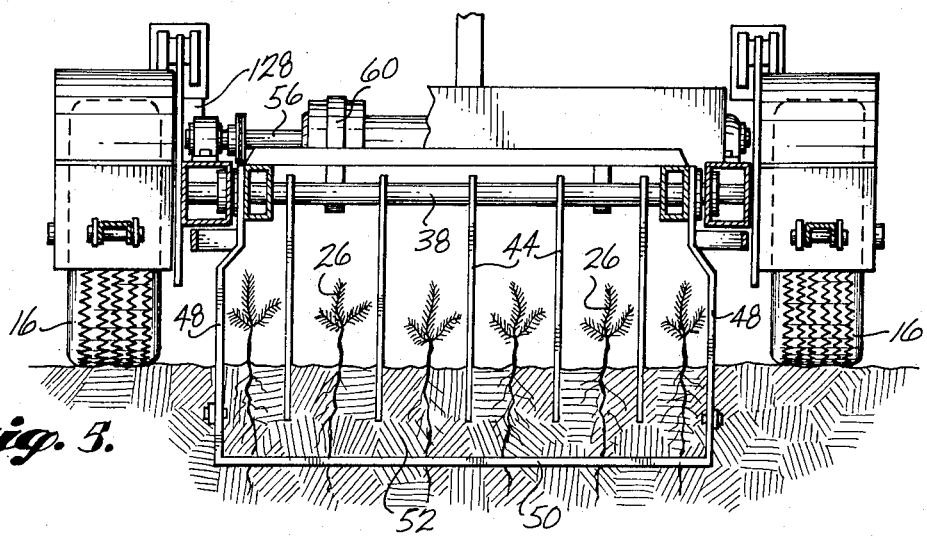
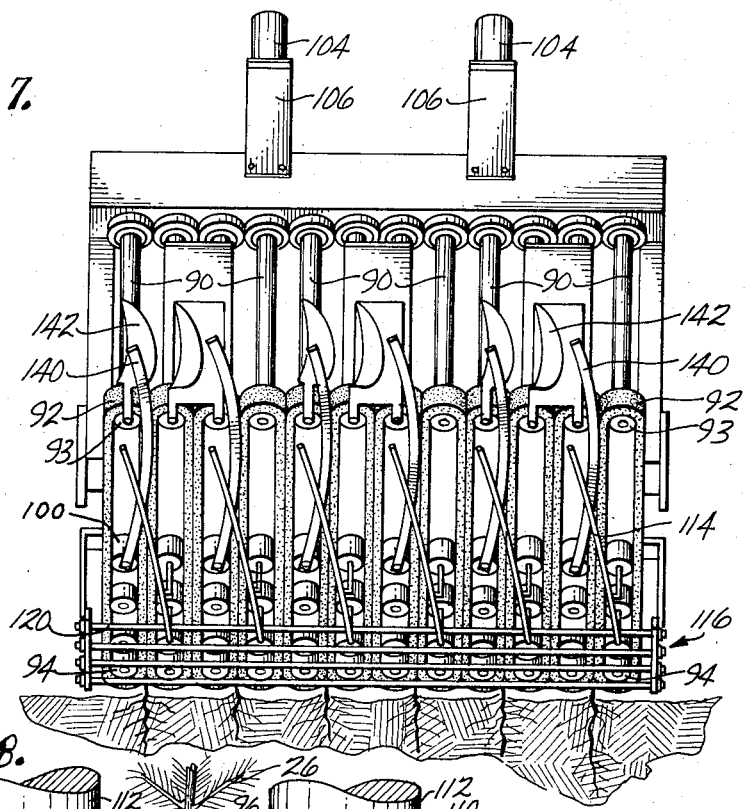
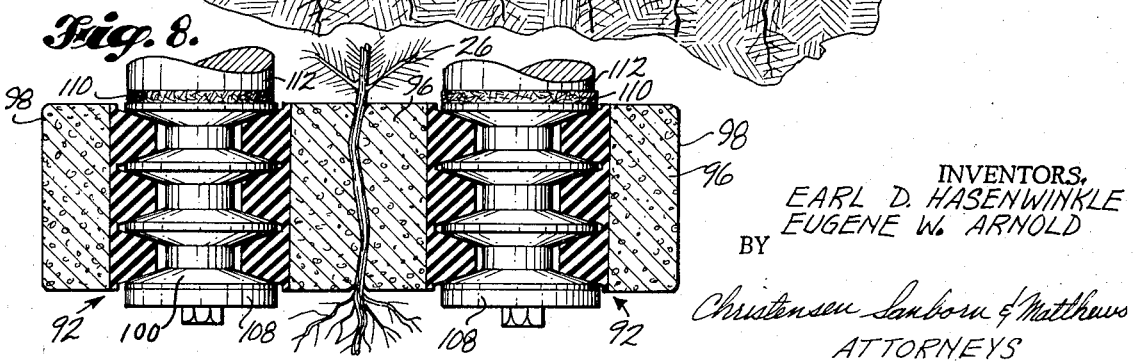

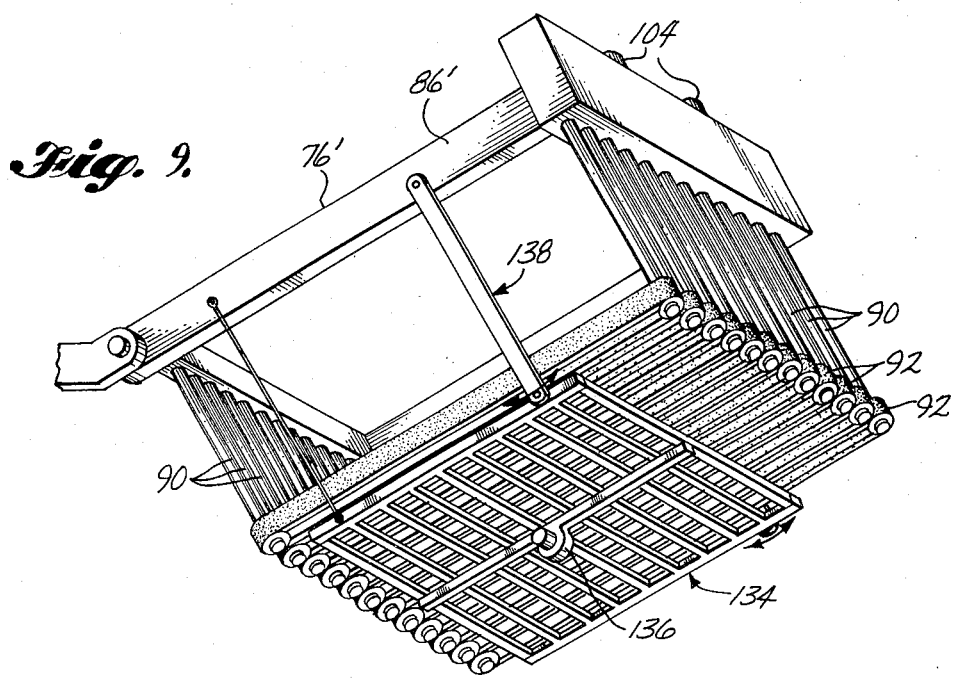
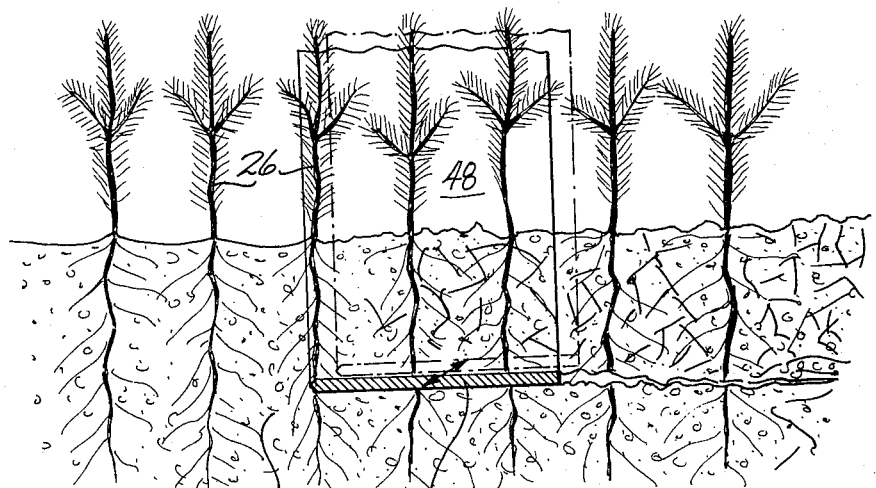

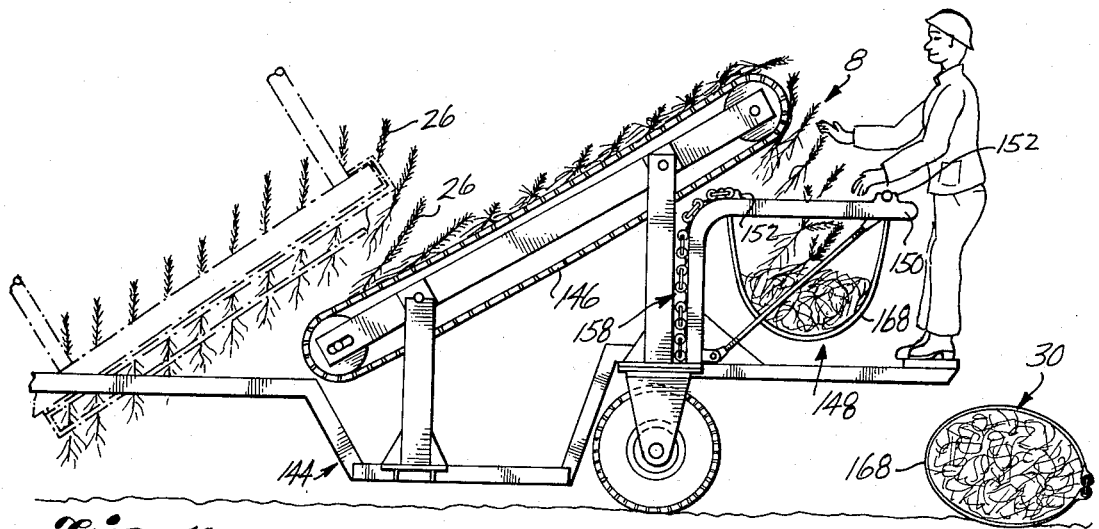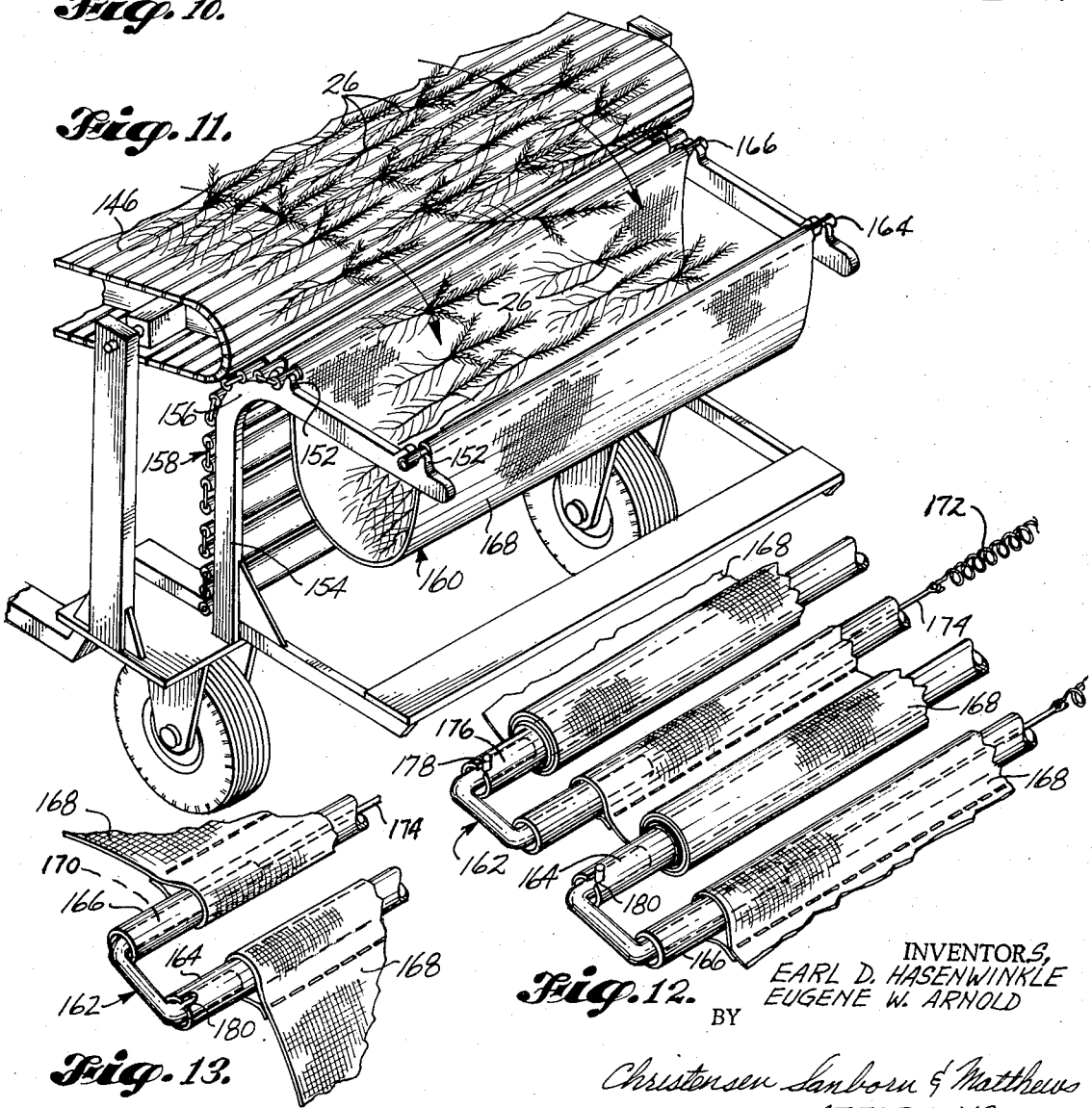

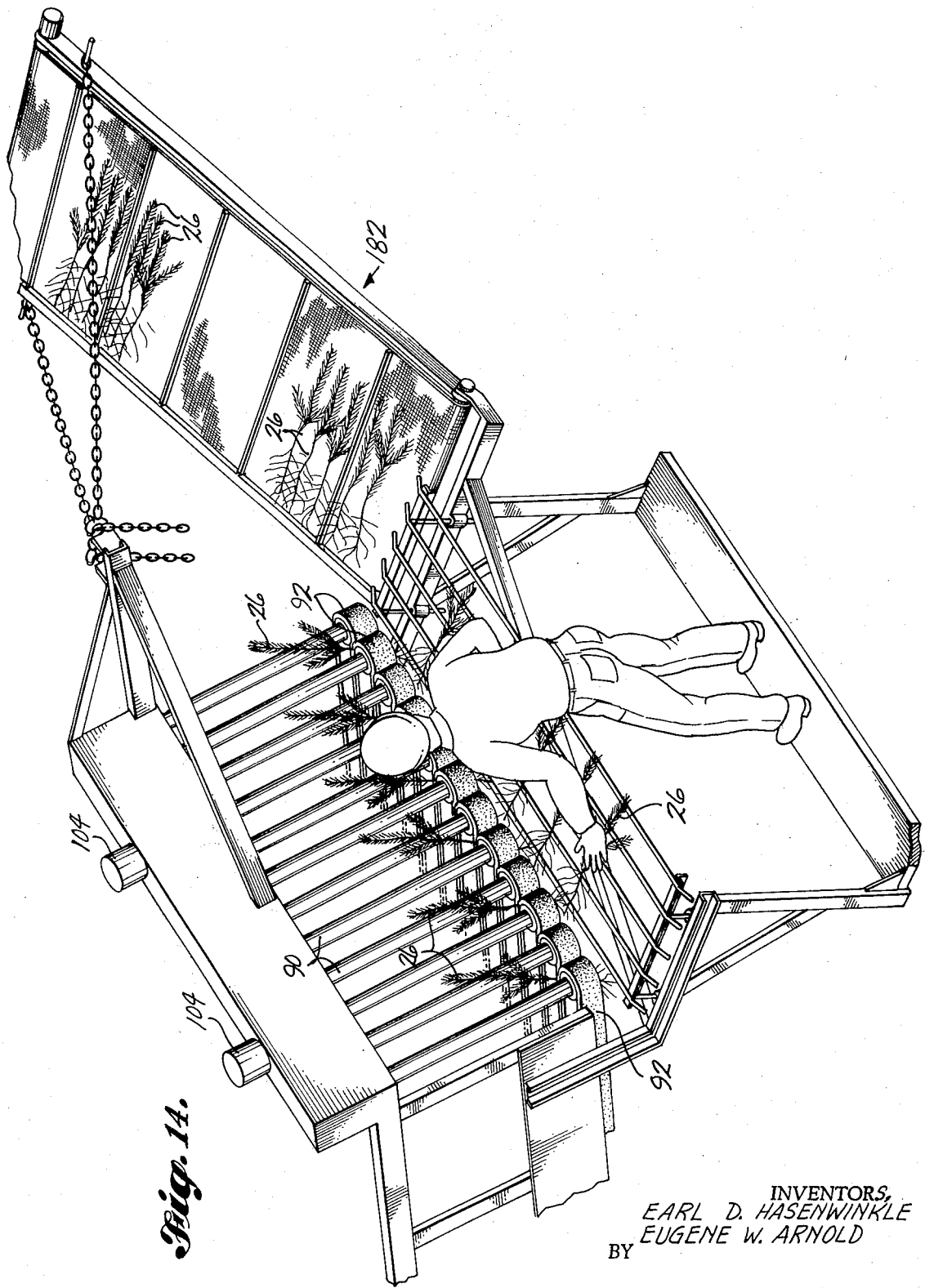

APPARATUS AND TECHNIQUE FOR HARVESTING PLANTS ROOTED IN THE GROUND

FIELD OF THE INVENTION

This invention relates to apparatus and techniques for harvesting plants that are deeply and/or complexly rooted in the ground; and particularly to apparatus and techniques for harvesting plants of this nature which are intended for replanting in the ground to undergo further growth thereafter.

BACKGROUND OF THE INVENTION INCLUDING CERTAIN OBJECTS THEREOF

Unlike plants which have simple and/or shallow root systems, such as carrots and onions, plants which have deep and/or complex root systems are not readily susceptible to machine harvesting because of the problem of parting the roots of the plants from the body of earth contiguous thereabout. This problem is particularly acute when the plants are intended for replanting to undergo further growth thereafter, as in the case of nursery-grown tree seedlings which are intended for replanting on a tree farm.

Heretofore, most such tree seedlings had been hand-harvested from the nursery for the reason that no means and techniques had been developed whereby they could be machine harvested without undue damage to the seedlings, and particularly to the root structures of the same. Yet at best hand laborers can harvest only about 1,000 seedlings per man-hour where the ground has been "pre-spaded" by an undercutting machine; and this rate requires a considerable seasonal labor pool, as well as a considerable harvesting period, with and in which to meet the demand for seedlings on the farm—a demand that often runs into millions of seedlings per season.

One object of the present invention is to provide an apparatus and technique of this nature whereby deeply and/or complexly rooted plants such as tree seedlings, can be machine harvested at rates in the order of 2,000 plants per minute per machine or better, using only a few men on the machine. Another object is to provide an apparatus and technique of this nature whereby the plants can be machine harvested without undue damage to the same, and in fact, with so little disturbance to the life tenure of the plants that they can be replanted for further growth thereafter at survival rates of 90–96 percent or better. Still another object is to provide an apparatus and technique of this nature whereby such plants can be machine harvested without the plants undergoing the strain of being forcibly disengaged from the earth which is contiguous to their roots, as for example, where in the past they were simply lifted from ploughed soil, while weighty quantities of earth material clung to the roots thereof and exerted a counterdirectional force tending to tear and otherwise damage the roots and stems of the plants. A further object is to provide an apparatus and technique of this nature whereby such plants can be machine harvested without the stems having to bear the strain of being heavily weighted down by a sizable "ball" of root-bound earth material during the course of their upward travel in relation to the ground. Still another object is to provide an apparatus and technique of this nature whereby such plants can be machine harvested by lift mechanisms which apply only a relatively slight gripping force to the stems of the plants; in fact, a force which might not otherwise be operable were the stems weighted down with undisengaged earth at the time of the lift operation. Still further objects include the provision of an apparatus and technique of this nature whereby such minimal gripping forces can be generated from a pair of travelling belts whose oppositely disposed faces define surfaces with which to grip the plants; as well as an apparatus and technique of this nature whereby the plants can be collected and discharged from the harvesting operation in a containerized condition, and at a rate commensurate with the machine output rates mentioned above. Still other objects include the provision of an apparatus and technique of this nature whereby the entire harvesting operation can be conducted on and with respect to a carriage that is translated in the lengthwise direction of rows of the plants; and which is operable to provide access to many rows at a time for the operation. Still further objects will become apparent from the description of the invention which follows hereafter.

SUMMARY OF THE INVENTION

These objects and advantages are realized by an apparatus and technique of our invention wherein the body of earth contiguous to the roots of the plant or plants, is severed from the surrounding ground; and the plants are relatively removed from the body of root-contiguous earth by lifting the plants in relation to the ground, and agitating the body of root-contiguous earth when it is severed from the ground, so as to loosen the earth and reduce its cohesion with respect to the roots, before the plants are lifted in relation to the ground. The agitated condition can be achieved in a number of ways, including vibrating or beating the body of earth into such a condition. Preferably, the body of earth is agitated to the extent that it achieves a fluidized condition, that is, one in which the particles of earth undergo such relative motion that the body performs as a liquid or "boils" in the ground. Where vibration is employed to agitate the body of earth, such a condition is achieved by adjusting the amplitude and frequency of the vibrations until fluidization occurs. In practice, the necessary energy input will vary from one locale to another, depending on the nature of the local ground material, but an empirical determination can be made and the means for agitating the root contiguous material can be designed and operated accordingly.

In particular, the agitated condition may be generated by means which are movable through the ground about the plants, and operable to vibrate or otherwise agitate the body of root-contiguous earth either during, subsequent to, or both during and subsequent to the severance of the earth material from the surrounding ground. Preferably, the agitation means is movable below the body of root-contiguous earth, and operable to impart vibratory forces to the same in a vertical plane during the severance of the body of earth material from the ground. Also, it is preferred to effect severance and agitation by a single means, as for example, where a U-shaped plough blade is drawn or otherwise moved through the ground about the body of earth, and simultaneously vibrated in a vertical plane with respect to the same. In fact, the vibratory effect can be used to reduce the pull power needed to draw the blade through the ground, as for example, where the blade is mounted on a rocker device which is supported on a carriage and rocked about a horizontal axis as the carriage is driven over the ground to pull the blade therethrough.

In preferred embodiments of the invention, moreover, the below-ground agitation means is accompanied by an above-ground agitation means which imparts further vibratory motion to the body of root-contiguous earth, if any, which is lifted with the plants during the extraction operation. This further motion may also be in a vertical plane and is usually imparted by a shaker grate or other such open-faced means which engage the underside of the plants, and vibrate in relation to the plants without imparting vibratory motion to the same, because of the open nature of the means, unless there is sufficient earth about the roots of the plants to rest the plants on the rim or rims of the openings in the vibratory means. In contrast, however, the primary, below-ground vibratory means is usually close-faced, as with the plough blade, to generate the maximum allowable vibration forces in the root-continguous earth material.

In the lift operation, only a slight gripping force is needed because of the light-weight condition of the plants made possible by the agitation means. Therefore, to capitalize on this fact, another feature of the invention concerns the nature of the lift mechanism itself. In the preferred embodiments of the invention, we employ a pair of travelling belts for the lifting operation, the faces of which are oppositely disposed to one another to define gripping surfaces for the plants therebetween, and biased relatively toward one another by non-yieldable backing means, but fabricated from an elastomeric material which accommodates the plants by undergoing elastic deformation between the backing means. The best example of such an elastomeric material is a cellular polymeric material of urethane, chlorinated butadiene or the like which has been expanded to the extent of being capable of the necessary deformation. Typically, the cellular material is foamed to a density of 5–8 pounds per cubic foot, and is bonded onto the belts in layers about one-half inch thick. To maintain the necessary backing, a series of crowder sheaves is employed between the ends of the belts, and the sheaves are spaced apart at a distance which maintains light contact between the faces of the belts as they travel from end to end.

The belts are mounted on a carriage behind the rocker device, and travel on an incline to the ground, with the faces of the same parallel to a vertical plane. Preferably, they are also vertically shiftable with respect to the ground, and are interconnected with the carriage by means which operate to maintain them at substantially the same inclination to the ground as they are so shifted.

The secondary agitation means is interposed between the belts and the ground; and in the preferred embodiments of the invention, both the belts and the secondary agitation means are cantilevered from the carriage on which the rocker device is mounted.

In order to collect and discharge the plants in containerized condition as they leave the harvesting operation, the invention also provides a further apparatus and technique wherein an elongated strip of flexible cloth-like covering material is mounted on a carriage behind the belts, in successive longitudinal sections of the same, each of which is rolled about a mandrel and disconnected from the strip as it is filled with plants. Preferably, each section is unrolled from the mandrel, and supported by an intermediate rod between mandrels; and, moreover, has means on one end thereof which are interconnectable alternately with the adjacent end of the next adjacent section, or the other end of the same section. For example, the sections may be unrolled and suspended as "hammocks" between the respective mandrels and rods; and the rods may have spring-loaded U-shaped clips on the ends thereof, which are alternately interengageably in recesses on the corresponding ends of the mandrels to the opposite sides thereof.

BRIEF DESCRIPTION OF THE DRAWINGS

These features will be better understood by reference to the accompanying drawings which illustrate the invention as it is applied to the harvesting of tree seedlings for transplanting to a tree farm.

In the drawings, FIG. 1 is a side elevational view of a preferred apparatus for carrying out the harvesting operation, when the apparatus is out of use;

FIG. 2 is a part side elevational view of the apparatus when the apparatus is ready for use;

FIG. 3 is a part side elevational view when the apparatus is in use;

FIG. 4 is a part plan view of the apparatus;

FIG. 5 is a schematic part cross sectional view of the earth severing and agitating mechanism in use;

FIG. 6 is a similar view but at right angles to that of FIG. 5;

FIG. 7 is an underside view of the belt lift mechanism in use;

FIG. 8 is a part cross sectional view of the lift mechanism;

FIG. 9 is an underside view of the belt lift mechanism in perspective, illustrating a different form of secondary agitating mechanism which may be used therebelow;

FIG. 10 is a part side elevational view of the apparatus, illustrating the hammock loaded containerization technique and the apparatus used therewith;

FIG. 11 is a part perspective view of the same;

FIG. 12 is a part perspective view of greater size, illustrating the clip connections between hammock sections;

FIG. 13 is a still larger view of a clip connection between corresponding ends of a filled hammock such as that off-loaded in the lower right corner of FIG. 10; and FIG. 14 is a part perspective view of an alternative conveyor arrangement between the lift mechanism and a collection point to one side of the apparatus.

DESCRIPTION OF THE PREFERRED EMBODIMENT

Referring to the drawings, it will be seen that the seedling harvesting apparatus is mounted on a chaise-like carriage 2 for travel over the surface of the ground, and comprises an earth severing and agitating mechanism 4, as well as a belt-lift mechanism 6 and a manually assisted containerization mechanism 8. The carriage 2 has a double-framed, open-bed chassis construction, and comprises a yoke-like inside frame 10, the crosshead 12 of which is interposed between and trunnioned to the forward ends of an outside frame comprising a pair of spaced, parallel side arms 14 that run lengthwise of the carriage and have fendered, ground-engaging wheels 16 at the rear ends thereof. The carriage is pulled behind a wheeled tractor 18 or other engine-driven vehicle, by means of a hitch 20 on the crosshead 12 of the inside frame 10. The beam 22 of the hitch is clevised about a vertical axis on the crosshead, and pivotally interconnected with the opposite end portions thereof, through a pair of hydraulic cylinders 24, so that the machine operator can make fine adjustments in the travel of the carriage, with respect to one of several clusters of spaced, parallel rows of seedlings 26 on the ground 28 of a nursery. In this particular instance, each cluster has six rows of seedling, and the wheels of the tractor 18 and carriage 2 are spaced apart accordingly; but if desired, each cluster may have a far greater number of rows, since the capacity of the apparatus is not limited so much by the planting practices of the nursery, as it is by the rate at which the seedlings can be containerized and removed from the field.

The carriage is also equipped with a hydraulic mechanism 32 for raising and lowering the apparatus with respect to the ground, and a power take-off mechanism 34 for driving the various operational components of the apparatus; but a detailed description of the former, and the mode of use of the latter, will be reserved for a later time when the apparatus itself has been more fully described.

Referring to the apparatus therefore, it will be seen that the earth severing and agitating mechanism 4 comprises a pair of spaced, parallel rocker beams 36 which are pivotally supported on a shaft 38 extending between the rearwardly directed inside arms 40 of the frame 10 of the carriage. The beams 36 are unbalanced toward the front of the carriage, and have a U-shaped plough blade 42 suspended therefrom slightly to the rear of the shaft 38. The plough blade 42 is multiply bolted to the beams 36, and is accompanied by a set of spaced, vertically oriented slicer blades 44 which are collared about the shaft 38 and welded to a cross beam 46 that is bolted and welded in turn to the rocker beams 36 at a location just forward from the shaft 38. The spacing between the slicer blades 44 corresponds to the spacing between the rows of seedlings in each cluster; and in addition, the blades 44 have a mitered or truncated side elevational configuration, as in FIGS. 1-3, with which they present a straight edge to the ground during the use of the apparatus. The spacing between the hanger legs 48 of the plough blade 42, on the other hand, is such that the bight 50 of the blade spans the full width of the cluster; and in use, the bight 50 moves through the ground at a tilt of several such as 2°-6°, which continuously varies, however, because of the manner in which the blade is employed, as shall be explained.

Together, the blades slice and plough through the ground about the roots of the seedlings and effectively sever the body of earth 52 contiguous to the roots of the seedlings from the surrounding ground 28. To some extent, the act of drawing the blades through the ground, also operates to loosen the earth material which is severed by the blades. However, it has been found that the seedlings can be more readily removed from the material, and with less damage to their roots, if the material is subjected to agitation, and preferably to fluidization, by imparting a vertically oriented vibratory motion to the bight 50 of the blade as it moves through the ground. Thus, provision is also made for rocking the beams 36 about the shaft 38, through an arc length of one-half inch or more, using a reciprocable drive mechanism 54 at the forward ends of the beams. The drive mechanism 54 comprises a chain-and-sprocket-driven shaft 56 which is journalled in a pair of pillow blocks 58 on the arms 40 of the inside frame, and equipped with a pair of eccentric cams 60 that are rotatably interengaged within a pair of follower cranks 62 pivotally interconnected to the sides of the beams. The drive sprocket 64 of the chain drive is secured to a stud shaft 66 which is pillow blocked in front of the cam shaft 56 on the frame, and driven in turn by the power take-off 34 from the tractor, through a universal (not shown) and gearbox 70 therebetween. For safety, the entire arrangement is covered by a housing 68, 72 which extends across the forward end of the frame 10 and has a seat 74 for an observer operator on top thereof.

The rocker beams 36 are also employed to agitate the root-contiguous earth 52 in a secondary agitation stage carried out after the seedlings have been lifted above the surface of the ground. However, since this stage follows the initial stage of the lifting operation, a more detailed description of it will be reserved until a later time when the lifting operation itself is apparent.

Referring now to the belt-lift mechanism 6, it will be seen that it is mounted on a jib frame 76 which is cantilevered from and pivotally interconnected to the upper rear ends of the arms 40 of the inside frame, by means of a pair of short links 78 which allow for considerable articulation between the two frames. Support for the jib frame 76 is provided by a pair of hydraulic cylinders 80 and turn-bolted guy lines 82 which are pivotally interconnected between the frame 76 and a shears-like standard 84 erected on the inside frame 10. Structurally, the jib frame 76 comprises a pair of longitudinally extending spars 86 rigidly interconnected by several cross beams 88; and the belt-lift mechanism is slung from these cross beams by means of a set of serially aligned, spaced, parallel spindles 90 depending from each of the uppermost and lowermost cross beams 88' and 88". The mechanism 6 comprises a multitude of elastomer-covered, hard rubber belts 92 which are stretched between and supported on pairs of driven and idler sheaves 93 and 94 carried at the lower ends of correspondingly longitudinally aligned pairs of spindles 90. The belts 92 have a multiple V-cross section, and the sheaves 93 and 94 are similar to cooperatively engage therewith. The coverings 96 on the belts 92 are a 20 durometer, shore A, foamed urethane or neoprene elastomeric material which renders the mutually opposing faces 98 of the belts highly elastically deformable. The faces 98 are maintained in light contact with one another by block assemblies of crowder sheaves 100 that are suspended on drop-posts 102 from the intermediate crossbeams 88''', and interposed between the driven and idler sheaves 93 and 94 of the respective belts. The assemblies 100 are arranged adjacent the bottom ends of the belts, and crowd the belts 92 together during the initial stage of their upward travel from the idler sheaves 94; thus providing the necessary backing to assure that the faces 98 of the belts engage with the seedlings 26 by localized deformation in the layers of elastomeric material 96. See FIG. 8 wherein it will be noted that the layers of material 96 take up the bulk of each seedling and accommodate to it by undergoing internal deformation or compaction in their respective body planes, rather than by extruding out of their planes.

To rotate the belts 92, the upper spindles 90 are gear-driven from a pair of hydraulic motors 104 mounted on brackets 106 on the uppermost crossbeam 88'. The crowder sheaves 100 are supported on thrust bearings 108, and also assist in carrying the weight of the belt assembly. Felt pads 110 protect the journal bearings 112 for the sheaves.

The secondary agitation stage mentioned earlier, is carried out by a mechanism 116 which is slung below the belt lift mechanism 6. Referring again to the inside frame 10 of the carriage, it will be seen that a pair of extension brackets 118 are rigidly cantilevered from the rear ends of the arms 40 of the frame and braced against the legs 48 of the plough blade to either side of the belt-lift mechanism. The brackets 118 have depending forward sections 118', and a grate 120 of spaced parallel shaker rods is suspended between the sections 118' in one of several levels of holes 122 spaced apart lengthwise thereof. The grate 120 under goes vibration with the blade 42, and is positioned to engage any still-earth-encased roots of the seedlings 26 as they travel upwardly through the belt-lift mechanism 6; so that before the seedlings exit from the upper end of the mechanism 6, their roots are effectively freed of all earth material, and their bodies as a whole assume a "naked" condition in which they are readily susceptible to mass packing and off-loading techniques. One such technique is illustrated in connection with the containerization mechanism 8, which will be described shortly after the mechanism 32 has been explained.

Referring again to the forward end of the carriage, it will be seen that there is a pair of upright brackets 124 welded to the front ends of the side arms 14 of the carriage, and another pair of such brackets 126 welded to the arms 40 of the frame 10 at more rearward locations thereon. Pivotally interconnected between the brackets on the respective sides of the carriage, is a pair of hydraulic cylinders 128 which operate to alter the angular relationship between the frame 10 and the side arms 14, thus raising and lowering the rear ends of the frame 10, as well as the jib frame 76, and the belt lift and containerization mechanisms 6 and 8, relative to the surface of the ground. This makes it possible, in turn, not only to elevate the apparatus to a fully inoperative position, as in FIG. 1, but also to adjust the elevation of the apparatus to accommodate variations in tree height. At the same time, it is also possible to achieve an adjustment in the elevation of the jib frame 76 relative to the carriage frame 10, by using the hydraulic mechanism 80. The adjustment does not substantially vary the inclination of the jib frame, because of the articulation in the linkage arrangement 78.

When the apparatus is elevated to its inoperative position, pegs 130 are inserted through staples 132 on the side arms 14, and interengaged in claw-like extensions of the brackets 126 on the frame 10, to padlock the frame 10 in the elevated position.

In FIG. 9, the secondary agitation grate 134 is pivotally slung from the spars 86' of the jib frame 76' by means of a four-bar linkage 138; and is separately vibrated by a hydraulic motor-driven vibrator 136 thereon, there being elastic couplings between the grate and the linkage to allow for the vibration.

In order to prepare the seedlings for the mass packing and off-loading technique carried out by the containerization mechanism 8, the jib frame 76 is also equipped with longitudinally extending guide bars 114, and curvilinear shoes 142, which are slung below and at the rear of the frame, respectively, to tilt the seedlings to one side as they exit from the belt-lift mechanism, the reason for which will be apparent shortly. In addition, other guide bars 140 are slung below the frame to prevent the seedlings from recirculating through the mechanism 6.

Travelling behind the lift mechanism, on another chaise-like carriage 144, is a slatted conveyor belt 146 which receives the seedlings from the belt mechanism as they are tilted by the bars and shoes into a more horizontal condition, and discharged crosswise thereof. The conveyor belt 146 elevates the seedlings once more, and ultimately discharges them into the manually assisted containerization mechanism 8. This mechanism comprises a davit-like stand 148, the spaced, parallel horizontal arms 150 of which are suitably braced and equipped with pairs of raised, notched, oppositely disposed knolls 152 thereon. The legs 154 of the stand are connected with the arms 150 by rounded shoulders 156; and in use, a string 158 of rolled, bagging hammocks 160 which are serially interconnected with one another by dual-purpose spring-loaded clips 162, is draped down over the shoulders 156 and legs 154 of the stand 148, to be used by a worker on the carriage in collecting and containerizing the seedlings for off-loading on the ground. Each hammock 160 comprises a pair of rigid tubes 164 and 166 having the ends of an elongated strip of loose canvas 168, sewn or otherwise secured thereon. The clips 162 are U-shaped and used in pairs; and are adapted to be slidably inserted within the open ends of the tubes, where the longer legs 170 of the clips are interconnected within their respective tube by coil springs 172 interconnected in turn by a wire 174. The shorter legs 176 of the clips have laterally outstanding pins 178 thereon which are adapted to be received in either of diametrically opposed notches 180 in the adjacent ends of the non-spring-equipped tubes 164.

In the string 158, the canvas 168 is wound about the nonspring-equipped tube 164 of each hammock, and the clip 162 of that hammock 160 is swung into interengaging relationship with the nonspring-equipped tube 164 of the next adjacent hammock, thus interconnecting all hammocks one to the next lengthwise of the string. On the stand, the last canvas-wound tube 164 is rested on the notched knolls 152 closest to the worker, whereas the spring-equipped tube 166 of that hammock is rested in the more remote knolls 152. Approximately one-half of the canvas is unwound and allowed to droop between the tubes. As the seedlings discharge from the conveyor belt 146, their added weight progressively unwinds the remainder of the canvas, until ultimately the whole of the hammock is filled with seedlings. At this point, the operator, who stands before the hammock on a step, removes the clips 162 of the spring-loaded tube 166 from their inserted positions in the canvas-wound tube 164 of the next hammock, and rotates them through 180° as he lifts the spring-loaded tube from its notches and draws it toward the now-unwound tube nearer him. When the two tubes have assumed a suitable proximity, the clips 162 are then inserted in the unwound tube to fasten the hammock into a closed condition 30, so that it can be off-loaded on the ground, as in FIG. 10, generally to be picked up by a loader vehicle thereafter. See FIG. 13 for the closed and clip-connected condition of the tubes.

The notch and pin connections 180, 178, serve to prevent the unused canvases from unwinding as each hammock is pulled into the loading position of FIG. 11.

In FIG. 14, a ribbed sidetracking conveyor 182 is employed to discharge the seedlings to one side of the line of movement of the carriages, generally to a packing vehicle (not shown) travelling abreast thereof. In this way, off-loading on the ground can be avoided; and the vehicle is usually a fixed-volume vehicle which is replaced by another when it is filled.

What is claimed is:

1. In combination, a carriage having ground engaging elements thereon which are rotatable about an operatively fixed axis of the carriage, to enable the carriage to be advanced over the surface of the ground relative to a series of plants rooted therein, spaced hanger means depending from the carriage, for advancement therewith on opposite sides of the series of plants, a blade which is interconnected to the hanger means, across the space therebetween, adjacent the lower end portions thereof, and insertable in the ground below the roots of the plants, to sever the body of earth contiguous to the roots, from the surrounding ground, as the carriage travels over the surface thereof, lift means which are movably mounted to advance with the carriage as it travels over the ground, but which are also mounted to move in relation to the carriage, over an elongated path inclined to the surface of the ground, and to engage the plants at a point adjacent the relatively lower end of said path, so as to lift the plants to a point adjacent the relatively upper end thereof, vibrator means which are movably mounted to advance with the carriage as it travels over the ground, but which are also mounted to vibrate in relation to the carriage, in the space between the hanger means, and to engage and impart vibration to the body of root contiguous earth at a point relatively adjacent the relatively lower end of the path of the lift means, when the body is severed from the ground, and drive means which are operable to actuate the vibrator means and the lift means, when the respective means engage the body of root contiguous earth and the plants, respectively.

2. The combination according to claim 1 wherein the blade is U-shaped in configuration and rigidly interconnected to the hanger means.

3. The combination according to claim 1 wherein the blade is vibratable in relation to the carriage, and the drive means includes means operable to vibrate the blade, when the blade is inserted in the ground below the roots of the plants.

4. The combination according to claim 1 wherein the hanger means are mounted on the carriage to vibrate in relation thereto, and have the blade fixed thereon, and the drive means includes means operable to vibrate the hanger means, when the blade is inserted in the ground below the roots of the plants.

5. The combination according to claim 4 wherein the hanger means are mounted on a rocker device which is supported on the carriage to be rocked about a horizontal axis thereof.

6. The combination according to claim 5 further comprising means operable to raise and lower the axis of the rocker device, relative to the carriage, to insert and withdraw the blade in and from the ground.

7. The combination according to claim 1 wherein the vibrator means is mounted to engage the body of root contiguous earth at a point below the surface of the ground, when the body is severed from the ground.

8. The combination according to claim 1 wherein the vibrator means is mounted to engage the body of root contiguous earth at a point above the surface of the ground, when the body is severed and lifted from the ground.

9. The combination according to claim 8 wherein the vibrator means include open-faced means which are engageable with the underside of the body of root contiguous earth, and adapted to impart vibratory motion to the body only when there is sufficient root contiguous earth to rest the plant or plants on the rim or rims of the openings therein.

10. The combination according to claim 1 further comprising a vertically oriented slicer blade which is supported on the carriage and insertable in the ground in the space above the first mentioned blade, between the hanger means.

11. The combination according to claim 1 wherein the lift means and the drive means for the same, are supported on the carriage.

12. The combination according to claim 1 wherein the lift means includes a pair of travelling belts, the faces of which are oppositely disposed to one another to define gripping surfaces for the plants therebetween.

13. The combination according to claim 12 wherein the gripping surfaces are biased relatively toward one another by non-yieldable backing means, but fabricated from an elastomeric material which accommodates the plants by undergoing elastic deformation between the backing means.

14. The combination according to claim 12 wherein the belts are vertically shiftable with respect to the surface of the ground, and are interconnected with the carriage by means which operate to maintain the belts on substantially the same inclination to the ground when they are so shifted.

15. The combination according to claim 12 wherein the faces of the belts are substantially parallel to a vertical plane.

16. In combination, a carriage having ground engaging elements thereon which are rotatable about an operatively fixed axis of the carriage, to enable the carriage to be advanced over the surface of the ground relative to a series of plants rooted therein, spaced hanger means depending from the carriage, for advancement therewith on opposite sides of the series of plants, a blade which is interconnected to the hanger means, to vibrate in relation to the carriage, in the space between the hanger means, adjacent the lower end portions thereof, and insertable in the ground below the roots of the plants, to sever the body of earth contiguous to the roots from the surrounding ground, as the carriage travels over the surface thereof, lift means which are movably mounted to advance with the carriage as it travels over the ground, but which are also mounted to move in relation to the carriage, to engage and lift the plants to a point above the surface of the ground, and drive means which are operable to actuate the blade and the lift means, when the blade is inserted in the ground below the roots of the plants, and the lift means are engaged with the plants.

17. The combination according to claim 16 wherein the hanger means are mounted on the carriage to vibrate in a vertical plane thereof, and the blade is rigidly interconnected to the hanger means, across the space between the lower end portions thereof, to vibrate in conjunction therewith.

18. The combination according to claim 16 wherein the hanger means are mounted on the carriage to vibrate in relation thereto, and the blade is responsive to the vibration thereof, to vibrate in the space therebetween, adjacent the lower end portions thereof.

* * * * *